Figure 1:
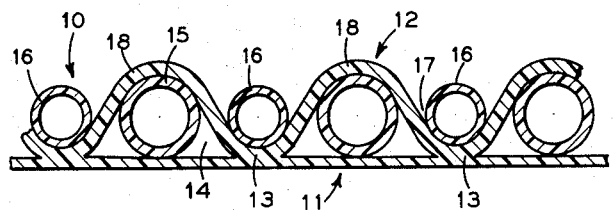

Jan. 14, 1964 M. M. KAHN 3,117,596
BUOYANT FLEXIBLE HOSE
Filed June 7, 1961

INVENTOR.
Marvin M. Kahn
BY
Philip E. Hilbert
ATTORNEY

United States Patent Office 3,117,596
Patented Jan. 14, 1964

3,117,596
BUOYANT FLEXIBLE HOSE
Marvin M. Kahn, Trenton, N.J., assignor to The Acme-Hamilton Manufacturing Corp., Trenton, N.J., a corporation of New Jersey
Filed June 7, 1961, Ser. No. 115,495
10 Claims. (Cl. 138—122)

This invention relates to buoyant flexible hose, and more particularly, concerns plastic hose adapted to float in water; for use in swimming pool cleaning operations, marine applications, and the like.

An object of this invention is to provide an improved buoyant hose, which is of minimum weight and maximum volume per unit length, to insure maximum buoyancy; yet is well reinforced to resist stresses incident to flexure and crushing impact.

Another object of this invention is to provide an improved flexible hose particularly useful in cleaning swimming pools, where such hose is associated with suction means; the hose being resistant to longitudinal contraction during use.

A further object of this invention is to provide an improved hose of the buoyant type, which is formed of plastic materials and includes multifunctional plastic elements; such elements constituting means for imparting buoyancy to the hose, also reinforcing the hose against stresses incident to the use of the hose, and making the hose resistant to longitudinal contraction when used under suction conditions.

Still another object of this invention is to provide an improved hose of the character described, which comprises a plastic hose having an integral helical chamber forming a wall portion thereof and tubular, helically wound plastic elements associated with the hose wall to reinforce the same and increase the buoyancy factor of the hose.

Yet another object of this invention is to provide a flexible plastic hose including a carcass portion with a pair of helically wound tubular reinforcing elements associated with the carcass portion, at least one of the reinforcing elements being embedded within the carcass, and both reinforcing elements serving to impart buoyancy to the hose and to counteract a tendency towards longitudinal contraction when the hose is used under suction conditions.

Still a further object of this invention is to provide an improved plastic hose of the buoyant type having a corrugated carcass portion and including a helical air chamber in the wall thereof for receiving at least one tubular reinforcing member therein for augmenting the buoyancy factor of the hose.

Yet another object of this invention is to provide in a hose of the character described, a pair of helically wound tubular plastic reinforcing elements, one of the elements being encased within the carcass wall, the other element being disposed between the outer, helically corrugated portions of the hose and exposed to view; the carcass and the second reinforcing element being formed of plastic of contrasting colors to give a distinctive appearance to the hose.

Other objects of this invention will in part be obvious and in part hereinafter pointed out.

Figure 2:
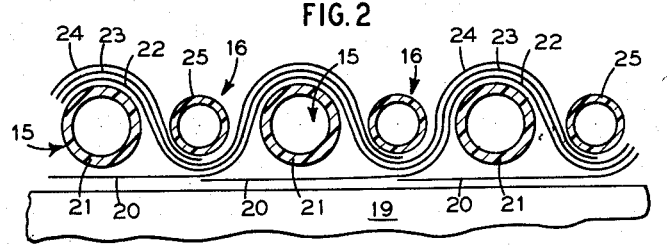
Figure 3:
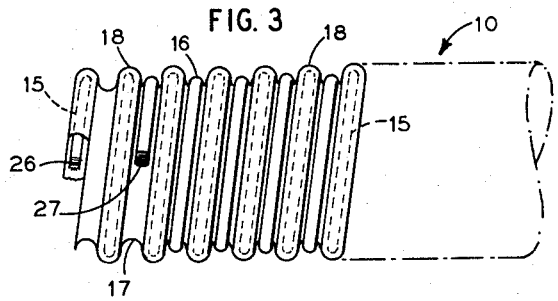
Figures 4, 5:
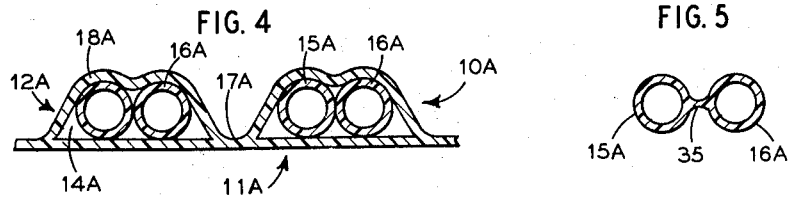

In the drawings, FIG. 1 is a partial, longitudinal section of a hose embodying the invention; FIG. 2 is a longitudinal sectional view showing the assembly of elements forming the hose shown in FIG. 1; FIG. 3 is a plan view of an end portion of the finished hose, with parts cut away; FIG. 4 is a view similar to that of FIG. 1, showing an alternative embodiment of the invention; FIG. 5 is a transverse sectional view of a modified form of reinforcing element for the hose of FIG. 4.

Essentially, the buoyant hose of the instant invention comprises a plastic carcass which includes a tubular inner wall and a helically corrugated outer wall, forming therebetween a helical chamber in which is disposed at least one helically wound tubular reinforcing element. A second helically wound tubular reinforcing element may be disposed in the valley portions of the corrugated carcass wall or may also be located within the helical chamber of the carcass.

In either case, the tubular reinforcing elements insure buoyancy of the hose in water, while leaving such hose with a minimized weight per unit length. Also, the hose is highly resistant to flexure or impact stresses and minimizes longitudinal contraction when the hose is used under suction conditions.

One embodiment of the invention is shown in FIGS. 1–3, wherein the hose 10 comprises an inner carcass portion 11 of tubular form and an outer carcass portion 12 of helically corrugated form. The carcass portions are integrated at helically disposed, opposed wall portions 13 and provide a helical chamber 14 therebetween. The carcass portions 11, 12 are formed of suitable plastic materials such as polyvinyl chloride, polyvinyl acetate-chloride copolymer, polyethylene, polypropylene, polystyrene, or the like.

Hose 10 is provided with reinforcing means in the form of a plastic tubular element 15, preferably extruded polypropylene tubing of a selected O.D. and wall thickness; the element 15 being disposed in chamber 14. A second plastic tubular element 16, which may have an O.D. somewhat smaller than that of element 15, is helically disposed in the valleys 17 and between peaks 18 of carcass portion 12.

The hose 10 may be formed, as shown in FIG. 2, by means of a mandrel 19, which is mounted for rotation, in suitable means, such as a lathe, not shown, in a manner known in the art. Thus, the procedure and apparatus shown in applicant's Patent 2,874,720 may be used for the purpose.

Plastic tape of suitable width and gauge, is fed to the rotating mandrel 19, together with tubings 15 and 16. The tape is wound helically with an overlap to provide a single ply 20 beneath the convolutions 21 of tubing 15, and a plurality of ply portions, say three superposed plies 22, 23 and 24 over each convolution 21 of tubing 15. The feed of the plastic tape and the tubings 15, 16 is arranged to leave convolutions 25 of tubing 16 exteriorly of the tape plies.

The tubing convolutions 25 will act as a pull down for the tape plies 22, 23 and 24 about tubing convolutions 21. It is understood that the tape as well as the tubings 15, 16 are properly tensioned; the tape is overlapped to the desired extent; and the tubings 15, 16 are properly spaced relative to each other, while the same are being fed to mandrel 19.

When the assembly of tape and tubings is completed on mandrel 19 over the length thereof; the combination is placed in an oven kept at a suitable temperature sufficient to integrate the tape plies into a unitary wall structure, as shown in FIG. 1. By way of example, a hose of 1.5" I.D. was made from a vinyl copolymer tape having a width of 1⅞" and a gauge of .012"; tubing 15 having an O.D. of 0.130" and a wall thickness of .032"; tubing 16 having an O.D. of 0.094" and the same wall thickness. The oven was kept at 340° F. and the hose was heated for a time interval sufficient to integrate the tape plies without deforming tubings 15, 16. Such heating operation also sets tubings 15, 16 to retain their convoluted form.

Tubing 15 may be formed of colorless polyethylene while tubing 16 is preferably formed of a colored polypropylene to make the exposed tubing resistant to the deleterious effects of ultraviolet rays. Also, with the tape forming the carcass walls 11, 12 of white polyvinyl plastic, the convolutions of tubing 16 in a contrasting color, provides a hose of pleasing appearance.

The integrated hose 10 is then removed from mandrel 19 and the ends thereof are trimmed for attaching couplings or fittings thereto. The terminal ends of tubing 15 are pulled forwardly and outwardly of chamber 14 and transversely heat sealed as at 26, FIG. 3. The sealed terminal ends 26 of tubing 15 may then be retracted back into chamber 14.

The exteriorly disposed tubing 16 has its terminal end portions extending to points somewhat short of the opposite ends of the hose carcass. Such end portions are transversely heat sealed as at 27 and are taped down in place by a few turns of adhesive tape, not shown. The couplings or other accessories, not shown, may then be threaded or otherwise mounted on the ends of hose 10, enclosing the terminal ends of tubings 15, 16.

The flexible tubings 15, 16 leave the hose 10 highly flexible and not only enhance the buoyancy of the hose but also provide resistance to stresses and strains due to flexure or impact. Furthermore, the convolutions 25 of tubing 16 act to resist longitudinal contraction of the hose when the same is used under suction conditions. While the carcass walls of hose 10 may be accidentally punctured, thereby admitting water to helical chamber 14, yet the overall buoyancy of the hose will be maintained by means of tubings 15, 16.

It is understood that the tubings 15, 16 may be of varied O.D. and wall thickness, to obtain selected buoyancy factors, flexibility and reinforcing capacity. While the hose 10 is preferably formed from plastic tape helically wound with overlapping convolutions, together with the tubings in proper disposition relative to the turns of tape, as described above; the hose structure may be formed by alternative procedures.

Thus, the hose carcass may be formed from a seamless plastic tubular sheath forming the inner wall thereof, with tubing 15 wound helically thereover in longitudinally spaced convolutions, followed by the application of a second seamless plastic tubular sheath thereover to provide the outer wall. Tubing 16 is then wound helically to pull down and corrugate the outer wall, leaving the turns of tubing 16 between the turns of tubing 15. The assembly, thus formed on a mandrel, is heat treated to integrate the contacting portions of the inner and outer walls and to set the tubings 15, 16, as previously described. Either of the seamless sheaths may be replaced by helically wound plastic tape.

In FIGS. 4, 5 is shown another embodiment of the instant invention. Here hose 10A is similar to hose 10 except that tubings 15A, 16A are both disposed within the helical chamber 14A formed between the outer carcass portion 12A and the inner carcass portion 11A. Tubings 15A, 16A are in laterally contacting relation and such tubings may be fed as a unit to the forming mandrel, in a manner similar to that described in making hose 10.

Thus, the plastic tape is fed to the mandrel to provide overlapping convolutions while tubings 15, 16 are supplied in a manner to enclose the same between tape turns of selected number above and below the tubings. The resultant assembly is heat treated to integrate the tape plies and to set the tubing convolutions without deforming their cross sections.

In hose 10A, the valley portions 17A are of limited longitudinal extent, while peak portions 18A are somewhat extended longitudinally to accommodate tubings 15A, 16A. Hose 10A also is of minimized weight and maximized volume per unit length thereof to provide excellent buoyancy characteristics; the tubings 15A, 16A being sealed at their terminal ends as previously described. In addition, the terminal portions of helical chamber 14A may also be transversely heat sealed.

In hose 10A, longitudinal contraction under suction conditions is minimized, while flexibility and resistance to flexure and impact stress is maintained. Hose 10A may also be formed of seamless tubular plastic sheaths to provide the carcass thereof, as previously described; the pull down of the outer wall portions between successive convolutions of the paired tubings 15A, 16A being achieved by means of a helically wrapped cord which is removable after the carcass is heat integrated.

While tubings 15, 16; 15A, 16A are preferably formed of polypropylene, they also may be formed from polyethylene, polyvinyl chloride, polystyrene or the like. The tubings 15A, 16A may also be laterally integrated by a fin 35 during their extrusion, as shown in FIG. 5. The integrated tubings facilitate feeding and reeling of the same, and simplify the supply thereof to the hose forming mandrel.

The reinforcing elements in hoses 10, 10A may be in the form of porous cords of polypropylene, polyethylene, polystyrene, polyurethane or the like. The porosity and stiffness of such cords may be selected to provide a desired density, buoyancy effect and stress resistance while retaining hose flexibility. It is understood that such reinforcing elements in tubular or porous cord form, may have cross sections of varying geometrical shapes.

The plastic selected for the tape or sheath forming the carcass of the hose, should coalesce or integrate at a temperature lower than the fusing or deformation temperature of the reinforcing tubings or cords, so as to leave such reinforcing elements unimparied during the oven treatment for integrating the carcass portions.

As various changes might be made in the embodiments of the invention herein described, without departing from the spirit thereof, it is understood that all matter shown or described shall be deemed illustrative and not limiting except as set forth in the appended claims.

Having thus disclosed my invention, I claim as new and desire to protect by Letters Patent:

1. A buoyant, flexible hose comprising helically wound reinforcement means comprising a pair of tubular members in laterally adjacent relation and having longitudinally spaced convolutions and a plastic carcass enclosing at least a portion of said reinforcement means, said carcass comprising an inner tubular wall portion and an outer helically corrugated wall portion having the valley portions thereof secured to opposed portions of said inner wall portion, said portion of the reinforcement means being disposed between the peak portions of the corrugated outer wall portion and opposed portions of said inner wall portion, with sealed helical air spaces between said portion of the reinforcement means and opposed surface portions of the carcass wall portions enclosing the same, said sealed air spaces being disposed on either side of said portion of the reinforcement means.

2. A buoyant flexible hose comprising a plastic tubular carcass having an enclosed helical chamber in the wall thereof, and at least one plastic helical tubular reinforcement member within said helical chamber and having surface contact with opposed wall portions of said chamber and providing sealed air spaces between opposed wall portions of said chamber and said reinforcement member on either side of said tubular reinforcement member.

3. A buoyant flexible hose comprising a plastic carcass having a tubular inner wall portion and a helically corrugated outer wall portion and forming a helical chamber therebetween, a first tubular reinforcement within said helical chamber, said first tubular reinforcement and wall portions of said inner and outer carcass wall portions providing sealed helical air spaces on either side of said first tubular reinforcement, and a second tubular reinforcement extending helically within the valley portions of said outer wall portion and between the peak portions thereof.

4. A hose as in claim 3 wherein the terminal portions of said tubular reinforcements are sealed.

5. A buoyant hose comprising a carcass portion and reinforcement means therefor, said carcass portion comprising helically wound plastic tape with overlapping convolutions, said reinforcement means comprising a first plastic tubing in helically wound form with longitudinally spaced convolutions interposed between overlapping tape convolutions, and a second plastic tubing in helically wound form with longitudinally spaced convolutions thereof lying between the successive convolutions of said first tubing and in contact with the outer surface portions of said tape convolutions, said tape convolutions being in integrated relation to form said carcass portion with a helical chamber enclosing said first plastic tubing and providing sealed helical air spaces within said chamber and on either side of said first plastic tubing.

6. A buoyant hose comprising a helical tubular plastic reinforcement means having longitudinally spaced convolutions and a plastic carcass enclosing at least a portion of said reinforcement means, said carcass comprising an inner wall portion and a helically corrugated outer wall portion forming therebetween a helical chamber for receiving said portion of the reinforcement means, said reinforcement means being tightly retained in place within said chamber by the contacting carcass inner and outer wall portions while providing sealed helical air spaces within said chamber on either side of said tubular reinforcement means.

7. A hose as in claim 6 wherein said reinforcement means comprises plastic tubing.

8. A hose as in claim 6 wherein said reinforcement means comprises porous plastic cord.

9. A flexible plastic hose comprising a carcass and reinforcement means therefor, said carcass comprising a tubular inner wall having a substantially smooth inner surface, and a helically corrugated outer wall secured to said inner wall and forming a helical chamber therebetween, said reinforcement means comprising a pair of helically wound tubings with laterally adjacent convolutions, the successive convolutions of one tubing being enclosed in said helical chamber with an extended circumferential portion thereof in contact with opposed surface portions of the peak portion of said carcass outer wall, the outer surface of said carcass inner wall making tangential contact with a circumferential portion of said one tubing whereby to provide sealed helical air spaces within said chamber and on either side of said one tubing, the successive convolutions of the other tubing lying between the successive convolutions of said one tubing and in contact with the valley portions of said corrugated wall.

10. A water buoyant hose comprising a plastic carcass including a tubular inner wall and a helically corrugated outer wall secured at the valley portions thereof to said inner wall and providing a helical chamber between said walls, tubular reinforcement means within said chamber and in contact with inner surface portions of the carcass inner and outer walls, said reinforcement means and said enclosing chamber walls providing laterally related sealed helical air spaces within said chamber with cross sectional dimensions greater than the wall thickness of said carcass or reinforcement walls.

References Cited in the file of this patent
UNITED STATES PATENTS

| | | |
|---|---|---|
| 2,136,230 | Berman et al. | Nov. 8, 1938 |
| 2,321,064 | Broedling | June 8, 1943 |
| 2,621,075 | Sedar | Dec. 9, 1952 |
| 2,740,427 | Swan | Apr. 3, 1956 |
| 2,874,723 | Kahn | Feb. 24, 1959 |
| 2,884,957 | Harris et al. | May 5, 1959 |
| 2,918,394 | Smith | Dec. 22, 1959 |
| 2,923,954 | Babcock | Feb. 9, 1960 |

FOREIGN PATENTS

| | | |
|---|---|---|
| 1,247,968 | France | Oct. 31, 1960 |

OTHER REFERENCES

"Polypropylene a New Plastic," E. W. Cronin, published by Mechanical Engineering, October 1958, pages 72–73 relied upon. Copy in Division 11.